United States Patent Office 3,325,575
Patented June 13, 1967

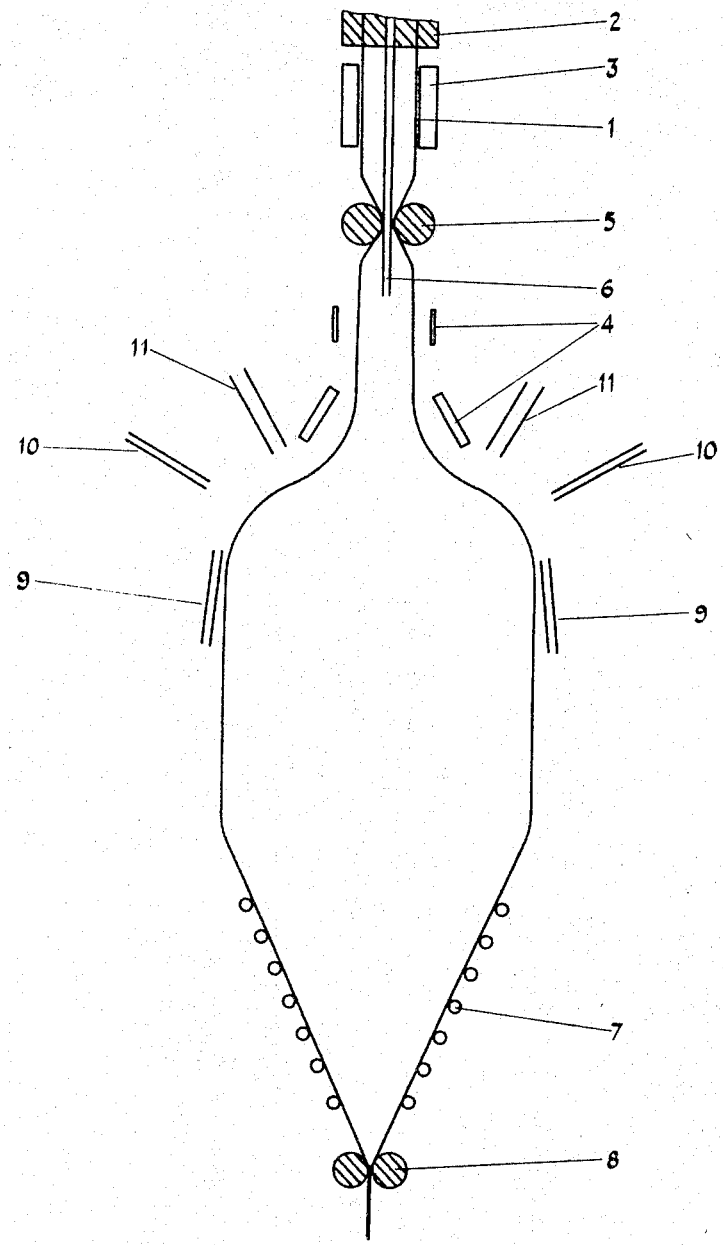

3,325,575
PROCESS FOR BIAXIALLY ORIENTING POLY-OLEFIN TUBING WITH COOLING DURING STRETCHING
Anthony Graham Marshall Last, Welwyn Garden City, England, assignor to Imperial Chemical Industries Limited, London, England, a corporation of Great Britain
Filed Apr. 12, 1962, Ser. No. 187,132
Claims priority, application Great Britain, Apr. 12, 1961, 13,192/61; Dec. 22, 1961, 46,038/61
3 Claims. (Cl. 264—95)

This invention relates to a process of stretching or drawing (which terms are used interchangeably) a linear organic thermoplastic, particularly a linear highly crystallisable organic thermoplastic, examples of which are linear (high density) polythene, polypropylene, 4-methyl pentene-1, and other linear polyolefines, polyethylene terephthalate or poly-3,3-bis-chloromethyloxacyclobutane by tubular expansion to produce a biaxially oriented film and to the film so made.

The object of this invention is to provide such biaxially oriented films of improved break-stress, as a result of introducing a high degree of planar orientation, it is believed too near to the maximum planar orientation. It is also an object of the invention to produce a linear thermoplastic biaxially oriented film having high thermal shrinkage properties as a result of certain preferred ways of operating the process. Another object of the invention, so far as it is applied to the production of biaxially oriented polypropylene film is the reduction of haze.

The invention consists in a tubular process of stretching a linear organic thermoplastic in which a tube, of the unoriented thermoplastic at a temperature below its melting point (defined as the temperature at which spherulites disappear using a hot stage polarising microscope) has its temperature adjusted to a temperature at which it can be uniformly expanded to biaxially orient it by internal gaseous pressure (with or without an additional stretch in the longitudinal direction) and is expanded and hauled off as a biaxially oriented linear organic thermoplastic film, characterised in that the film is cooled by circumferentially uniformly applied draughts of air at least over the second half of its zone of expansion, i.e. on the shoulder of the stretching tube, so that a high internal gaseous pressure can be and is used to expand the tube.

The invention is particularly applicable to processes in which the tube is heated up to a temperature at which it can be uniformly expanded to biaxially orient it, for instance, by one or more infra-red heaters.

In its relation to linear highly crystallisable polyolefin films the invention in its preferred form consists in a tubular process of stretching a highly crystallisable linear polyolefine in which a tube of the unoriented polyolefine has its temperature adjusted, preferably by heating to a temperature below its melting point at which it can be uniformly expanded to biaxially orient it and is expanded by internal gaseous pressure (with or without an additional stretch in the longitudinal direction) and hauled off as a biaxially oriented polyolefine film, characterised in that the film is cooled by circumferentially, uniformly applied draughts of air at least over the second half of its zone of expansion and under conditions of temperature of the tube before stretching such that the internal gaseous pressure is sufficiently high to give a hoop stress in the stretched film above 4,000 p.s.i. and preferably for best tensile properties (and for polypropylene the lowest haze) above 5,000 p.s.i.

The stretch ratio applied to the expanding tube in both the longitudinal and transverse directions in preferably at least 6:1 so that a substantially uniformly stretched film is obtained. The upper limit of the stretching ratio is the maximum which can be applied without bursting the film, this being above 10:1, but, for most economical use of plant it is preferred that it is not above 8:1.

When the stretch ratios are between about 6:1 and 6.4:1, there is a further advantage, in the production of polypropylene film, in that high thermal shrinkages are obtained, particularly in the transverse direction. These thermal shrinkages are in general highest at highest hoop stresses.

Insofar as this invention relates to the preparation of polypropylene film having a high thermal shrinkage, the process conditions for the preparation of such films are best defined in terms of the hoop stress in the tube of unoriented polypropylene before it commences to draw.

The invention therefore, in so far as it relates to the preparation of high shrinkage polypropylene films, consists in a tubular process of stretching polypropylene in which a tube of unoriented polypropylene has its temperature adjusted, preferably by heating, to a temperature below the melting point at which it can be uniformly expanded to biaxially orient it and is expanded by internal gaseous pressure (with or without an additional stretch in the longitudinal direction), and is hauled off as a biaxially oriented polypropylene film, characterised in that the film is cooled by circumferentially, uniformly applied draughts of air at least over the second half of its zone of expansion and under conditions of temperature of the tube before stretching it and internal gaseous pressure such that the hoop stress in the polypropylene tube just before it commences to stretch is at least 16.5 p.s.i. and preferably, in order to get the higher shrinkages, it is at least 20 p.s.i.

In this latter aspect of the invention, the invention also consists in a transparent shrinkable biaxially oriented polypropylene film having an "area" shrinkage (measured at 120° C. for 1 minute) of at least 20% combined with a tensile break strength of at least 25,000 p.s.i. in all directions in its plane and/or an average haze of less than 10% (measured as set out in Example I).

The "area" shrinkage is defined as the sum of the longitudinal and traverse shrinkages and is, of course, an approximation to the true area shrinkage from which it differs by a small amount which can be neglected.

In general, the process of this invention, in so far as it is directed to the production of shrinkable polypropylene film, gives the above films and under optimum conditions, transverse direction shrinkages (at 120° C.) of above 18% are obtained with films of thickness 0.0004 to 0.0016 inch.

In so far as the invention relates to the production of a linear highly crystallisable (high density) polythene film, the conditions are preferably adjusted so that the hoop stress in the polythene tube just before it begins to stretch is at least 8 p.s.i. and preferably at least 10 p.s.i.

In general, a shrinkable linear highly crystallisable polythene film may be obtained which has an "area" shrinkage (measured at 100° C. for 1 minute) of at least 26% combined with a tensile break strength in all directions in its plane of at least 18,000 p.s.i. Under optimum conditions the shrinkage may be as high as 30%.

The film is cooled by the uniformly applied draught of air during the stretching to a temperature substantially below that at which it starts to stretch, in this high inernal pressures and hoop stresses can be achieved thereby giving a substantial maximum degree of orientation. Also when shrinkable polypropylene films are desired under these conditions a minimum of heat-seating takes place in the tube before it cools. Thus, a stretched polypropylene film, immediately after the final diameter is reached on stretching, is preferably at a temperature below 100° C. and still more preferably below 80° C. For example, the tube may start to stretch at about 145° C., and at the point at which it completes the stretching it may be at temperatures as low as 60° C. (at for instance a throughput rate of 70 ft./min. for 0.0005 inch thick film but at high throughput rates the temperatures may be higher). The temperature may be as low as 60° C. particularly with polythene films.

The desired temperatures at various parts of the stretching tube may, for instance, be maintained by suitable disposition of infra-red heaters or supplies of hot and cold gas; for instance, the low temperatures are achieved by cooling the stretching bubble of film with controlled draughts of air.

It is not easy to measure the temperature of the film being stretched, particularly when this, for convenience, is heated by infra-red heaters; but empirically, if the temperatures are decreased, the pressure required to expand the tube increases. The pressure is also related to the size of the bubble of stretched film required. It should not be so high as to burst it. By increasing the flow of cooling air over the later stages of the bubble higher pressures can be used than would otherwise be the case.

The tube to be stretched is conveniently produced by melt extrusion and solidification in a cool sizing die. In the case of polypropylene the degree of cooling may be sufficient to produce the unstable form of crystallinity characteristic of melt extruded and quenched polypropylene. In this case it is convenient to heat the tube to the stretching temperature sufficiently rapidly for the crystallinity not to change to the stable crystallinity, but this is not essential. If such rapid heating is employed, the tube stretches more readily and lower stretching temperatures are needed to obtain the desired hoop stresses in the stretched tube. But at normal guages and high rates of production with polypropylene it is not normally practicable to get the polypropylene in this quenched state and rapid heating is then unnecessary. These factors should be taken account of an adjusting the process variables in order to obtain the high hoop stresses characteristic of this invention. With linear thermoplastics which are brittle when crystalline, such as polyethylene terephthalate it is issential, as is well known to the art, to obtain them in an amorphous condition before stretching them, for instance by quenching them after melt extrusion.

The hoop stress in the stretched film $S_d$ is the tangential stress in circumferential elements of the stretched film when inflated at full diameter (i.e. in the direction tangential to the cylinder formed by the stretched film) and is calculated from the diameter of the stretched film $d$ and the pressure of the film $p$, according to the formula $S_d = p \cdot d/2t$ where $t$ is thickness of the film.

Although I do not wish to be limited to any theory proposed to explain my invention in so far as it relates to the use of high hoop stress in the tube of polypropylene before it commences to stretch in order to get high shrinkable films, the following theoretical explanation is given to enable the invention to be better understood.

To obtain films of high shrinkage it is believed that the film should start to draw at the lowest possible temperature, i.e. at the highest possible hoop stress at the neck of the bubble where it commences to draw. For a given transverse draw ratio in the biaxial tube stretching method, the hoop stress at the neck where the tube begins to draw and the hoop stress at full diameter are directly related. As the draw ratio decreases, at fixed pressure $p$ and diameter $d$, the hoop stress at the neck increases.

At full diameter the hoop stress, as already stated, $S_d = p \cdot d/2t$.

The thickness of the stretched film $t$ is related to the cast tube thickness $T$ by: $t = T/R_f \cdot R_t$ where $R_f$ and $R_t$ are the forward (or longitudinal) and the transverse stretch ratios respectively. Also if $D$ is the cast tube diameter at the neck, $d = R_t \cdot D$.

Now hoop stress at the neck $$S_n = p \cdot D/2T = p \cdot d/2t(R_f \cdot R^2_t)$$

That is, for a given final diameter, the hoop stress at the neck, $S_n$, is inversely proportional to the square of the transverse draw ratio and also is inversely proportional to the first power of the forward draw ratio. Therefore to get the highest stress at the neck, $S_n$, the lowest draw ratios particularly the lowest transverse draw ratios, consistent with acceptable thickness variations should be used.

In accordance with the above deduction, it is preferred to use the lowest draw ratios consistent with an acceptable thickness variation in the film. If the draw ratio is too low, large thickness variations may be encountered and in general with polyolefine films when the draw ratio in any direction falls below 6:1, thickness variations which are consistently about 50% are often encountered when for instance a tube is drawn to give film .0005 inch thick. Consistent with this, in general, the geometric mean stretch ratio (i.e. the square root of the product stretch ratios) will be in the range 6:1 to about 7:1, and in order to get film of the highest shrinkages it will be in the range 6:1 to 6.4:1.

In general, in order to get a highly shrinkable film with an improved balance of shrinkage properties and with more steady bubble stretching conditions and in order to get an enhanced hoop stress in the tube before stretching, it is preferred to have a somewhat higher machine direction draw ratio than transverse draw ratio and the former is preferably reduced when lower thickness films are to be made; thus for .00075 inch polypropylene film, 6.5:1 transverse draw ratio and 7.5:1 machine direction draw ratio are satisfactory; but for .00045 inch polypropylene film, 6.5:1 transverse draw ratio together with 7.2:1 machine direction draw ratio give similar results. The best draw ratios are readily found by trial and error.

Preferably the sideways drawing is made to commence before or at the same time as longitudinal drawing commences; usually the stretching machine will be sufficiently powerful to give a stretch to the tube of polypropylene in the longitudinal direction before sideways stretching takes place. This, when done, can be seen by putting marks on the tube e.g. with a yellow wax pencil before it reaches the heating zone with a known distance between marks and then measuring or noting visually the separation of the marks just before the tube starts to stretch. Some "neck-down," i.e. reduction of the tube diameter, is often visible but the reduction of the hoop stress at the position where the film starts to stretch due to this reduced diameter is out-weighed by the increase in hoop stress due to the decrease in the thickness of the tube wall. The thinner tube will blow at a lower pressure due to this decrease in wall thickness and hence a lower hoop stress at full diameter is encountered than in the case where this longitudinal stretching does not take place. Therefore although the hoop stress at full diameter may be lower, a high hoop stress is still obtainable at the position where the film commences to stretch transversely and a high shrinkage can therefore be obtained. To ascertain accurately the hoop stress at the position where the film commences to stretch, the machinery involved in the stretching process is stopped; the bubble of film is then allowed to "freeze" and the tube wall thickness when it begins to stretch transversely is measured directly. From this wall thickness, the pressure in the tube and the tube diameter, the hoop stress can be calculated in accordance with the formula set out above.

Stretching the tube in such a manner that there is longitudinal stretching before transverse stretching commences is in general undesirable because such a process is more difficult to control, and, in general, appears to give poorer thickness uniformity. However, it is not intended to exclude such a mode of stretching from this invention.

Stretching processes illustrative of the invention are now described with reference to the examples and the accompanying drawing.

Example I

Polypropylene tube 1 produced by melt extrusion from a die 2 and cooling in a cooled sizing die 3 was heated to the stretching temperature (by infra-red heaters 4) in such a way that the tube had substantially the stable crystalline modification of polypropylene when stretching commenced. The tube was passed to the stretching region through isolating nip rollers 5 through which the stretching gaseous pressure was supplied through a probe 6 (see British specification No. 787,497). Cooling was applied to the "shoulder" of the stretching tube of film where it finished stretching through a series of annular slits mounted on the end of a ring of air pipes 9 surrounding the tube. (In an alternative system having the advantage that larger volumes of air can be used with greater cooling effect, air is supplied through pipes and slits 9 and/or 10 is extracted by tubes 11 so that it cannot interfere with the infra-red heaters 4 by cooling them.) The infra-red heaters, the pressure and the degree of air cooling were adjusted so that the hoop stresses were set out as in Table 1. The stretched tube was passed through a collapsing guide 7 and haul off nip rollers 8. The stretch ratios used and properties of the film are set out in Table 1. In a further way of operating the invention, used in Example II below, an enclosure is used round the stretching film to keep out adventitious draughts and a vertical air current is maintained in the housing with forced feed of cooling air at the lower end of the housing (where pipes 9 are shown) in accordance with our British application No. 27,439/61.

The haze of the film in Table 1 was measured as follows:

A small illuminated hole 1 mm. diameter forms a light source which is concentrated by means of a lens (5 cm. focal length, stop of ¾ inch diameter) to a bright 5 mm. diameter spot on the centre of the surface of a photosensitive, barrier layer cell at a distance of approximately 30 cm. from the lens. A black shield, 6 mm. in diameter, on a glass slide is arranged so that it can slide over the cell surface and prevent light falling on the cell. The film to be tested is held close to the lens surface on the cell side of the lens. The black shield is slid away so that all the light penetrating the film falls on to the cell surface except that reflected or absorbed by the slide glass and that scattered so widely that it falls outside the cell surface (45 mm. diameter). The black shield is then slid into place so that it is concentric with the light spot and only light scattered through at least an angle of about 6 min. of arc can then fall upon the cell surface. The outer limit of scattering angle is about 4½°. Nearly all light scattered between 30 minutes of arc and 4½° falls upon the cell surface and a proportion of the light scattered between 6 minutes and 30 minutes falls on the cell surface. Measurements of the complete polar diagram for drawn polypropylene films on appropriate instruments show that nearly all scatter takes place within 3° of the incident beam. The output of the photosensitive cell with the black shield in position is expressed as a percentage of that with it slid out and is called the "haze." Thus haze is measured as the amount of light scattered from a beam outside a 6 minute of arc angle. A haze of 15% was obviously visible. A haze of 5% was just visible. The average haze is calculated as the average of maximum and minimum values of the haze recorded.

Shrinkage tests are carried out as follows:

Measured test strips are freely suspended in a thermostated, stirred, air oven at the required temperature for 1 minute. The change in length is measured in the longitudinal and transverse directions and the two shrinkages are added to obtain the "area" shrinkage. The detailed technique involves laying a crease free sample of film on a cork sheet having two parallel lines ruled on it, 25 inches apart and thin strips of adhesive tape are stuck on to the film to mark the position of the lines. These strips are placed perpendicularly to the direction of shrinkage being measured. The film is now cut into specimen strips, 2½ inches wide, along the direction to be measured. The distances between the marker strips on each film strip is now accurately measured, the specimens are attached at one end to a frame which is placed in the oven between light metal grids which limit their movement in the oven. After 1 minute the film strips are removed and their length is re-measured.

TABLE 1

| | | | | | | | | |
|---|---|---|---|---|---|---|---|---|
| Stretch Ratio (in each direction) | 7:1 | 6.4:1 | 6.4:1 | 6.4:1 | 6:1 | 6:1 | 6:1 | 6:1 |
| "Layflat" stretched film width, inches | 33 | 37.5 | 37.5 | 37.5 | 34.5 | 34.5 | 34.5 | 34.5 |
| Bubble pressure, inches of water | 5½ | 2 | 5 | 7 | 5 | 6 | 7 | 8 |
| Stretched film hoop stress, p.s.i. | 4,170 | 1,750 | 4,320 | 6,040 | 3,980 | 4,760 | 5,550 | 6,350 |
| Hoop stress before the tube commenced to stretch,[1] p.s.i. | 12.2 | 6.7 | 16.5 | 23.0 | 18.5 | 22.1 | 25.6 | 29.4 |
| Yield stress, p.s.i.: M.D. | 4,670 | 3,400 | 3,960 | 4,700 | 4,050 | 4,570 | 4,300 | 3,880 |
| T.D. | 4,450 | 3,500 | 4,580 | 4,410 | 4,210 | 4,650 | 4,430 | 4,250 |
| Break Stress, p.s.i.: M.D. | 25,100 | 19,100 | 24,200 | 27,500 | 23,900 | 26,800 | 25,650 | 27,600 |
| T.D. | 26,500 | 20,200 | 28,700 | 26,200 | 25,200 | 28,100 | 26,400 | 29,600 |
| Elongation at break, percent: M.D. | 51 | 73 | 52 | 47 | 46.5 | 55 | 47 | 59 |
| T.D. | 50 | 75 | 53.5 | 45 | 53 | 52.5 | 51.5 | 50.5 |
| Average Haze, percent | 9.5 | 16.5 | 6.5 | 4 | 9.5 | 6 | 4.5 | 3.75 |
| Shrinkage:[2] M.D. | 6.4 | 2.7 | 7.0 | 8.3 | 6.3 | 6.7 | 9.5 | 10.8 |
| T.D. | 7.9 | 6.3 | 16.5 | 17 | 16.8 | 18.3 | 20.2 | 21.6 |

[1] The stretching took place in such a manner that longitudinal and tranverse stretching commenced at the same time.
[2] Shrinkage measured at 120° C.
M.D.=machine direction. T.D.=tranverse direction.

TABLE 2

| Expts. | Control Runs | Cast tube thickness, inches | Draw ratio in each direction | Hoop stresses | | "Area" shrinkage, percent at 120° C. | |
|---|---|---|---|---|---|---|---|
| | | | | At neck, p.s.i. | At full diameter, p.s.i. | High speed cast tube, 20 ft./min. | Low speed cast tube, 10 ft./min. |
| | a | 0.025 | 7.5:1 | 8.0 | 3,360 | 10.8 | 11.4 |
| | b | 0.0235 | 7.2:1 | 9.2 | 3,430 | 13.1 | 13.6 |
| | c | 0.019 | 6.5:1 | 13.5 | 3,680 | 17.4 | 15.0 |
| | d | 0.025 | 7.5:1 | 11.1 | 4,600 | 15.7 | 18.1 |
| | e | 0.0235 | 7.2:1 | 13.8 | 5,150 | 17.0 | 18.9 |
| 1 | | 0.019 | 6.5:1 | 19.2 | 5,300 | 23.8 | 20.8 |
| 2 | | 0.025 | 7.5:1 | 16.8 | 7,060 | 21.7 | 19.8 |
| 3 | | 0.0235 | 7.2:1 | 18.4 | 6,860 | 21.3 | 22.8 |
| 4 | | 0.019 | 6.5:1 | 24.9 | 6,800 | 24.4 | 26.4 |

Example II

Polypropylene (prepared in the presence of hydrogen, of melt flow index between 30 and 45 with a 10 kg. load at 190° C.) was converted into film by the process described in Example I using the method and apparatus of our British application No. 27,439/61. The data shown in Table 2 was obtained for film of final thickness .00045 inch where the temperature after stretching finished with the high speed runs was about 100° C. and with the low speed runs about 80° C. The melt flow index of the polypropylene of the film obtained was about 90.

Control runs a–c were at low hoop stress at the neck and at full diameter and low shrinkages were observed. Control runs d and e were at high full diameter hoop stress but low hoop stress at the neck and gave shrinkages below the level normally obtained according to the invention; it is to be noted that the draw ratio was above the 7.0:1 preferred upper limit. Experiments 1–4 show that the highest shrinkages are obtained with the lower draw ratios; the film of these experiments had a tensile break strength of at least 25,000 p.s.i. in all directions and its average haze was below 10%, measured as described in Example I.

Further experiments were carried out in the same manner as above but the thickness of the final film was .00075 inch while the transverse draw ratio was 6:1 and the machine direction draw ratio was as shown in Table 3. The cast tube diameter was 0.027 inch. A sealing muff surrounded the tube just after it reached full diameter. At steady state conditions the temperature of the film just below the muff was measured to give an indication of the temperature as the film ceased stretching. The cast tube speed was 8 ft./min. The temperature at which stretching was complete was between 80° and 100° C., measured with a contact thermocouple.

The film made according to these experiments had a tensile break strength in all directions greater than 25,000 p.s.i. and an average haze below 10%.

Shrinkage (at 100° C. for 1 minute) in the longitudinal direction _____percent__ 12.6
Shrinkage (at 100° C. for 1 minute) in the transverse direction _____percent__ 17.4
"Area" shrinkage (at 100° C. for 1 minute) _____percent__ 30

The films made according to any of these examples could, if desired, be heat-set to reduce their thermal shrinkage in which case, of course, the primary object of the invention would be to produce a film having a high tensile strength combined with thermal stability. Polypropylene films could be heat-set at 120° C. to 160° C. and linear polythene at 80–120° C. with or without permitting shrinkage as desired.

The films according to the invention may also be stretched again in the longitudinal direction to increase the tensile strength in that direction, with shrinkage in the transverse direction if desired. A suitable temperature for such stretching is in the range from 30° to 5° C. below the melting point of the polymer.

The films of this invention whether uniformly biaxially oriented or not may be used for most of the applications for which polythene, cellulose ester or polyethylene terephthalate films have been used, particularly because of their high strength and because of the high clarity normally obtained and can be used in thicknesses between .00025 inch and .01 inch. For instance, uncoated films may be used for the following packaging applications—overwrapping, bag-making, for sachets, for twist wrapping, for adhesive sealed bags, for sterilisable packs, for baleable packs, for laminating and as bottle cap wads. Coated packaging films may be used for overwrapping, bag-making, laminating, for baleable packs and bottle cap wads. More specifically, whether coated or not, the films may be used for general wrapping of foodstuffs, soap powders, cigars, cigarettes, pipe tobacco, cement, textiles, greased and untreated machine parts, hardware,

TABLE 3

| Experiment | Hoop stress | | Shrinkage at 120° C. | | | M.D. Draw ratio |
|---|---|---|---|---|---|---|
| | At neck, p.s.i. | At full diameter, p.s.i. | M.D., percent | T.D., percent | "Area" percent | |
| 5 | 20.1 | 4,350 | 7.0 | 14.7 | 21.7 | 6.5:1 |
| 6 | 24.3 | 5,180 | 8.6 | 18.1 | 26.7 | 6.5:1 |
| 7 | 28.2 | 6,100 | 8.8 | 19.5 | 28.3 | 6.5:1 |
| 8 | 20.1 | 4,800 | 6.6 | 14.5 | 21.1 | 6.0:1 |
| 9 | 23.2 | 5,400 | 8.4 | 18.7 | 27.1 | 6.0:1 |
| 10 | 28.2 | 6,600 | 8.6 | 19.0 | 27.6 | 6.0:1 |

Example III

Linear highly crystallisable polythene (density=0.95, "Hi-Fax" 1400E supplied by Hercules Powder Company) film was made by the process described in Example I using the apparatus described in the accompanying drawing (using the jets 9 only for cooling air). The film was blown with a longitudinal direction stretch ratio of 7:1 and a transverse stretch ratio of 8.3:1 and when blown was .00047 inch thick. The hoop stress just before blowing commenced (i.e. at the neck) was 10.4 p.s.i. and in the blown film was 5,000 p.s.i. The film had the following properties.

Break strength in longitudinal direction__p.s.i__ 18,000
Break strength in transverse direction____p.s.i__ 22,000 gifts and so on; packaging of articles to be sterilised, such as medicaments, pharmaceuticals, instruments, chemicals, gauze, bandages, and the like and packaging of foodstuff which may be heated in the package and stored.

In particular the shrinkable film according to the invention can be used for shrink packaging and shrink wrapping applications.

Further applications include electrical uses such as capacitor windings, transformer insulation, slot lining, electrical tapes and insulation tapes and for cable lapping.

Various other electrical applications include small coils in the form of metal laminations for telephone and radio equipment, primary insulation for heat resistant wire, split mica insulating tape, i.e. mica sheets laminated between film, small condensers for instance having metal foil laminated to film or using vacuum metallised film, whether resistant electrical wire such as a conductor wrapped with film and coated with asphalt, wrapping for submerged pipe to insulate against ground currents, and laminations with paper to improve dielectric strength of the paper and other web materials.

They may be used for sound recording discs, tapes and magnetic tapes, i.e. sound or video tapes for general or computer use, particularly those tapes manufactured from asymmetrically but biaxially oriented film having the greater strength and orientation in the longitudinal direction.

They may be used for adhesive tapes, typewriter ribbons, textile threads, meterological balloons, conveyor belting, book covers, as a release agent in moulding processes and parting sheets for low pressure laminating, for hot stamping foils, as mulches, for greenhouse glazing, and insulation and for glazing and insulation generally e.g. as protective wrapping for rock wool insulation bags and bales, for concrete underlays and overlays, as temporary coverings in building operations, for acoustic tiles and pipe lagging, e.g. outside wrapping or inside liner for piping of all types, particularly plastic piping. They may be printed or dyed and may be laminated to glass and other films such as polythene, polyethylene terephthalate, polyvinyl chloride, and vinylidene chloride/vinyl chloride copolymers or to plastics generally and to rubbers. In particular they may be used as safety-glass interlayers e.g. as an interlayer for laminating glass-to-glass or for laminating glass to polymethyl methacrylate; windows for containers and envelopes; transparent cans; container and bottle cap liners; laminations with metal foil to give metallic effects in fabrics; laminations with wood, paper or fabrics for pictures, book covers, wall protectors around light switches; wallpaper in clear, pigmented or printed form; millinery applications for example, in braid form either alone or laminated or another film of a different colour; e.g. cigarette packages; pressure sensitive tapes and adhesive tapes and transparent measuring tapes, particularly when made of asymmetrically stretched film.

They may also be used for drawing office purposes, e.g. as tracing cloths after sand blasting or other abrasive treatment to give a rough surface, and for graphic arts and photographic films, for black and white or colour photography.

The following miscellaneous uses may also be mentioned: as a plastic binder for strengthening non-woven fabrics; fabric replacement for garment bags, shoulder covers, and the like; tubing for replacing metal tubing in various applications; protective devices such as face shields, goggles and the like, base films for metallising by vacuum deposition, sputtering and other techniques; ropes or belts fabricated by twisting and/or braiding ribbons or filaments; bacteriostatic applications for inhibiting mould growth; mildew or bacteria growth; barrier against diffusion of gases, e.g. as a barrier against diffusion of dichlorodifluoromethane from refrigerator systems; as a base sheet for deep drawing or forming operations e.g. forming sheets into the shape of containers, dishes, plates and other hardware, cross-lamination of one-way stretched sheets employing a pigmented or coloured adhesive, the laminations being employed in window shades, awnings, tarpaulins, and the like and various other specific applications such as playing cards, greeting cards, milk bottle hoods, drinking straws, tying ribbons, tracing cloth, display and picnic dishes, disposable protectors against waste gases, showcase covers, ground-sheets for tents, tent and car windows and screens, printed charts, nomographs and scales, umbrellas, raincoats, file folders, refrigerator bags, tobacco pouches, drum heads, tops for convertible cars, car covers in shipment and storage, display car holders, ticker tape, protective covering for flash bulbs, bottle caps and window shades, heat shrinkable bands applied in the form of the heat shrinkabe film according to this invention.

They may also be used as a base for abrasive articles such as sandpaper and emery paper after coating with an adherent coating containing the abrasive.

I claim:

1. A tubular process of stretching and orienting polypropylene film to biaxially orient it to obtain a highly shrinkable film, in which the tube of unoriented polypropylene, at a temperature below its melting point at which it can be uniformly expanded to biaxially orient it, is expanded by internal gaseous pressure, and is hauled off as a biaxially oriented polypropylene film, characterised in that the film is cooled by circumferentially, uniformly applied draughts of air at least on the shoulder of the stretching tubes and under conditions of temperature of the tube before stretching it and internal gaseous pressure such that the hoop stress in the polypropylene tube just before it commences to stretch is at least 16.5 p.s.i.

2. A tubular process of stretching and orienting linear highly crystallisable polythene to obtain a highly shrinkable film in which a tube of the unoriented polythene, at a temperature below its melting point at which it can be uniformly expanded to biaxially orient it, is expanded by internal gaseous pressure and is hauled off as a biaxially oriented polythene film characterised in that the film is cooled by circumferentially, uniformly applied draughts of air at least on the shoulder of the stretching tube and under conditions of temperature of the tube before stretching it and internal gaseous pressure such that the hoop stress in the tube just before it commences to stretch is at least 8 p.s.i.

3. A process according to claim 1 in which the stretching tube of polypropylene film is cooled to a temperature below 100° C. by said draughts of air.

References Cited

UNITED STATES PATENTS

| | | |
|---|---|---|
| 2,444,059 | 6/1948 | Neher et al. |
| 2,461,975 | 2/1949 | Fuller _____ 264—95 |
| 2,461,976 | 2/1949 | Schenk. |
| 2,947,031 | 8/1960 | Chow et al. |
| 2,990,306 | 6/1961 | Dyer. |
| 3,009,208 | 11/1961 | Pirot. |
| 3,061,876 | 11/1962 | Lloyd et al. |
| 3,141,912 | 7/1964 | Goldman et al. ____ 264—290 X |

FOREIGN PATENTS 110,409   12/1960   Pakistan.

OTHER REFERENCES

"Extrusion of Film Sheet," pages 85 and 86, Plastics Engineering Handbook, 3rd edition, by Reinhold Publishing Corp., 1960.

ALEXANDER H. BRODMERKEL, *Primary Examiner.*

R. J. DOHERTY, B. SNYDER, A. H. KOECKERT,
*Assistant Examiners.*